United States Patent [19]

Chang et al.

[11] Patent Number: 5,389,463
[45] Date of Patent: * Feb. 14, 1995

[54] BATTERY SEPARATOR

[75] Inventors: Victor S. Chang, Ellicott City; Richard T. Giovannoni, Columbia; Richard C. Hartwig, Laurel, all of Md.; Joseph T. Lundquist, Gilroy, Calif.; Christian B. Lundsager, Ashton, Md.; Marc E. Parham, Bedford; Anthony J. Laccetti, North Andover, both of Mass.

[73] Assignee: W. R. Grace & Co.-Conn., New York, N.Y.

[ * ] Notice: The portion of the term of this patent subsequent to Sep. 13, 2011 has been disclaimed.

[21] Appl. No.: 41,646

[22] Filed: Apr. 1, 1993

[51] Int. Cl.$^6$ .................................................. H01M 2/16
[52] U.S. Cl. ................................... 429/142; 429/251; 429/252
[58] Field of Search .................. 429/142, 251, 252; 428/365, 372

[56] References Cited

U.S. PATENT DOCUMENTS

| | | |
|---|---|---|
| 2,953,622 | 9/1960 | Gray . |
| 3,036,143 | 5/1962 | Fisher et al. . |
| 3,351,495 | 11/1967 | Larsen et al. . |
| 3,419,430 | 12/1968 | Michaels . |
| 3,419,431 | 12/1968 | Michaels . |
| 3,450,650 | 6/1969 | Murata . |
| 3,632,404 | 1/1972 | Dessuminiers et al. . |
| 3,651,030 | 3/1972 | Desumminiers et al. . |
| 3,696,061 | 10/1972 | Selsor et al. . |
| 3,709,841 | 1/1973 | Quentin . |
| 3,749,604 | 7/1973 | Langer et al. . |
| 3,766,106 | 6/1971 | Yurimota et al. . |
| 3,853,601 | 12/1974 | Taskier . |
| 3,855,122 | 12/1974 | Bourganel . |
| 3,900,341 | 8/1975 | Schoichiro et al. . |
| 3,933,561 | 1/1976 | Larson et al. . |
| 4,008,203 | 2/1977 | Jones et al. . |
| 4,024,323 | 5/1977 | Versteegh ........................ 429/249 |
| 4,072,802 | 2/1978 | Murata et al. ..................... 429/147 |
| 4,098,930 | 7/1978 | Nakayama et al. . |
| 4,153,760 | 5/1979 | Sundberg et al. ................. 429/252 |
| 4,201,838 | 5/1980 | Goldberg ........................... 429/145 |
| 4,210,998 | 7/1980 | Gaunt ................................ 29/623.4 |
| 4,221,846 | 9/1980 | Armstrong et al. . |
| 4,243,562 | 1/1981 | Petit . |
| 4,245,013 | 1/1981 | Clegg et al. . |
| 4,251,605 | 2/1981 | Inoue et al. ...................... 429/145 |
| 4,273,903 | 6/1991 | Rose .................................. 525/534 |
| 4,286,015 | 8/1981 | Yoshida et al. ................... 428/305 |
| 4,287,276 | 9/1981 | Lundquist et al. ............... 429/206 |
| 4,351,860 | 9/1982 | Yoshida et al. ................... 427/246 |
| 4,481,260 | 11/1984 | Nohmi ............................... 428/398 |
| 4,529,646 | 7/1985 | Sundet .............................. 428/315.5 |
| 4,650,730 | 3/1987 | Lundquist et al. ............... 429/62 |
| 4,681,750 | 7/1987 | Johnson et al. .................. 423/339 |
| 4,699,857 | 10/1987 | Giovannoni et al. ............. 429/204 |
| 4,714,663 | 12/1987 | Arnold et al. .................... 429/101 |
| 4,721,568 | 1/1988 | Buys et al. ....................... 210/500.37 |
| 4,731,304 | 3/1988 | Lundquist et al. ............... 429/62 |
| 4,755,299 | 7/1988 | Brüschke ......................... 210/640 |
| 4,776,999 | 10/1988 | Kohn ................................. 264/41 |

FOREIGN PATENT DOCUMENTS

| | | |
|---|---|---|
| 4959167 | 10/1972 | Japan . |
| 565022 | 10/1942 | United Kingdom . |
| 1107782 | 3/1968 | United Kingdom . |

Primary Examiner—Stephen Kalafut
Attorney, Agent, or Firm—Howard J. Troffkin

[57] ABSTRACT

A battery separator composed of a microporous sheet product having first and second major surfaces and a thickness of less than about 50 mils, formed from a uniform mixture of a halogenated polyolefin polymer and a filler or a halogenated polyolefin polymer and surfactant/filler agent, said sheet product having a fibrous sheet embedded within said mixture and between the first and second major surfaces. The porosity of the sheet product is at least about 50 volume percent composed of pores such that the average pore diameter increases from each major surface towards the interior of the sheet product's thickness.

15 Claims, No Drawings

BATTERY SEPARATOR

BACKGROUND OF THE INVENTION

The subject invention is directed to a sheet product which is useful in providing separator components for batteries and to improved batteries containing the formed separator. More specifically, the present invention is directed to a thin microporous sheet product composed of a highly filled polymeric matrix or a low-level filled (including unfilled) polymer matrix having a porous support sheet embedded between the sheet product's first and second major surfaces and having an average pore size distribution across the thickness of the sheet product such that there is a gradient of nominal pore size increasing from each major surface towards the interior central portion of the sheet product's thickness.

Storage batteries have at least one pair of electrodes of opposite polarity and, in general, have series of adjacent electrodes of alternating polarity. The current flow between these electrodes is maintained by an electrolyte which may be acidic, alkaline, or substantially neutral depending upon the nature of the battery system. Separators are located in batteries between adjacent electrodes of opposite polarity to prevent direct contact between the oppositely charged electrode plates while freely permitting electrolytic conduction. Separator components have taken many forms. In a modern battery design, the separator is in the form of a thin sheet or film or more preferably, a thin envelope surrounding each electrode plate of one polarity.

It is generally agreed that one of the critical elements in a battery design is the separator component and, to be highly effective in the design, the separator should have a combination of features. The battery separator must be resistant to degradation and instability with respect to the battery environment, including the other battery components and the battery chemistry. Thus, the battery separator must be capable of withstanding degradation of strong acids (such as sulfuric acid commonly used in acid battery designs) or strong alkali (such as potassium hydroxide used in alkaline battery designs) and to do so under ambient and elevated temperature conditions. Further, the separator should also be of a thin and highly porous character to provide a battery of high energy density. Although battery separators of thick or heavy design have been utilized in the past, such materials detract from the overall energy density of the battery by reducing the amount of electrodes that can be contained in a predetermined battery configuration and size. Another criteria is that the battery separator must be capable of allowing a high degree of electrolytic conductivity. Stated another way an effective separator membrane must exhibit a low electrical resistance when in the battery. The lower the electrical resistance the better the overall battery performance will be. A still further criteria is that the separator should be capable of inhibiting formation and growth of dendrites. Such dendrite formation occurs during battery operation when part of the electrode material becomes dissolved in the electrolyte and, while passing through the separator, deposits therein to develop a formation which can, after a period of time, bridge the thickness of the separator membrane and cause shorting between electrodes of opposite polarity.

In addition to meeting the above combination of properties, it is highly desired to have a sheet product which is capable of exhibiting good physical properties of tensile strength, flexibility and ductility to withstand the handling and processing without developing imperfections and cracks which would cause the sheet product to be unsuitable as a battery separator. Meeting this criteria is contrary to some of the above 10 described properties (i.e. thin and light weight material and high porosity to provide good conductivity). In providing envelope type separators, these physical properties must also be accompanied by the ability of the material to be sealable by heat and to able to be folded upon itself so as to provide a pocket separator design. As part of the physical property requirements, the sheet product should be capable of exhibiting a high degree of integrity during formation and use.

Various microporous membranes or sheet materials have been suggested for utilization as a battery separator. Separators conventionally used in present battery systems are formed of polymeric films which when placed in an electrolyte or an electrolyte system, are capable of exhibiting a high degree of conductivity while being stable to the environment presented by the battery system. The films include macroporous as well as microporous materials. The porosity permits transportation of the electrolyte. Examples of such separators include unfilled polyolefin sheets which have been stretched and annealed to provide microporosity to the sheet, such as is described in U.S. Pat. Nos. 3,558,764; 3,679,538; and 3,853,601. In addition, polyolefin separators which include filler materials are disclosed in U.S. Pat. Nos. 3,351,495 and 4,024,323. In general, such polymer/filler compositions are friable materials and tend to exhibit electrical resistance which does not permit the formation of a highly efficient, high energy battery system.

Polyvinyl chloride has been used in forming battery separators. The polymer is conventionally initially formed into small particles which are sintered and pressed into sheet material. The polymer has also been mixed with a liquid and a filler to form a doughy composition which can be kneaded into a sheet from which the liquid evaporates. Such separators are difficult to form, provide a product of high electrical resistance and have poor physical properties. Specifically, such separators are brittle and not capable of undergoing the various stress forces encountered in the battery formation and operation and of being folded upon itself to provide enveloped designed batteries. Polyvinyl chloride has been copolymerized as well as blended with other polymeric material (i.e. copolymers of vinyl chloride and acrylonitrile) in attempts to impart better properties to the resultant product. Although improved products are obtained, they do not provide the combination of properties described above.

It is highly desired to have a battery separator which is capable of exhibiting very low electrical resistance while at the same time providing the combination of properties described above.

SUMMARY OF THE INVENTION

The present invention is directed to a microporous sheet product, battery separators formed therefrom and to improved batteries which incorporate the thus formed battery separator. The subject separator comprises a microporous sheet composed of a halogenated polyolefin substantially uniformly mixed with a filler and/or with a polycarboxylic acid polymer salt or a polysulfonic acid polymer salt and has a porous sheet embedded therein and which has a pore structure distribution throughout the thickness such that the nominal pore size of pores increases incrementally from each major surface to the interior, central section of the sheet product's thickness.

DETAILED DESCRIPTION

The present invention provides a flexible sheet material having high void volume, porosity of a microporous nature and a configuration which substantially inhibits dendrite formation. The subject sheet product has high tensile strength and ductility sufficient to withstand handling during battery formation and to be capable of being formed into desired shapes for use in a battery, is capable of exhibiting a high degree of stability to acid and neutral battery environment over sustained periods of time and of allowing a high degree of electrical conductivity (very low electrical resistance). Still further, the subject sheet material has been found to possess the ability to maintain its integrity and performance characteristics while being able to be formed into a pocket design separator (i.e. not crack or produce voids when being folded on itself and/or manipulated into this preferred design).

The sheet product of the present invention should be in the form of a very thin sheet of less than 50 mils, and preferably less than 10 mils in thickness. The thin sheet is bound by two major surfaces with a thickness therebetween. The body making up the thickness is composed of a substantially uniform composition formed from a halogenated olefin polymer and particulate filler and/or with a polycarboxylic acid or polysulfonic acid polymer salt, each of which is fully described hereinbelow. The body, in addition, contains therein a sheet extending the length and breadth of the present sheet product and substantially contained between the present sheet products two major surfaces.

For purposes of clarity, certain terms used in the present description and in the appended claims have the following meanings:

A "sheet" is intended to define a unitary article having a large surface and is used herein to refer to a scrim or a woven, or non-woven or knit material used as a component of the subject separator.

A "battery" refers to a single electrochemical cell or, alternately, a multiple of electrochemical cells which are designed to operate in coordination with each other.

A "separator" is a component of a battery which provides a means of separation between adjacent electrode plates or members of opposite polarity. The separator of the present invention may have various configurations, such as a flat or ribbed material in the form of a membrane or envelope design capable of maintaining separation between electrodes.

A "sheet product" is intended to define a composite product of the present invention which is microporous, has pore size distribution across the thickness such that there is a gradient of nominal pore size which increases from each major surface of the sheet product towards its central interior portion, has a porous sheet substantially contained within the sheet product's thickness and has a form of a polymer-filler composite or a halogenated olefin polymer/(structure enhancing agent) composite (with or without filler). The sheet product can be used to form separators suitable as a battery component.

A "halogenated olefinic polymer" or "halogenated polymer" and "polyvinyl halide" are intended to define aliphatic hydrocarbon polymeric materials wherein a portion of the carbon-hydrogen groups have been replaced by carbon-halogen (preferably chlorine) groups. Although the polymeric material can be formed from a variety of monomeric units and methods, the polymers can be envisioned as being formed from vinyl halide units (i.e. polyvinyl chloride) or derivatives thereof (i.e. post-chlorinated polyvinyl chloride, alkyl substituted polyvinyl chloride) or by halogenation of polyalkylenes (i.e. chlorination of polyethylene).

The terms "vinylidene fluoride polymer" or "vinylidene difluoride polymer" are intended to define halogenated polymers which are homopolymers of vinylidene difluoride and interpolymers of vinylidene difluoride with other fluorine-containing ethylenically unsaturated monomers which are copolymerizable therewith and are present in from 0 to about 30 weight percent of the resultant polymer product.

The term "polycarboxylic acid polymer salt" is intended to define a hydrocarbon polymer having a multiplicity of aliphatic carboxylic acid units pendent from the polymer chain with at least a portion of said acid units in the form of a salt.

The term "polyacrylic acid polymer salt" is intended to define a polycarboxylic acid polymer salt having a multiplicity of unsaturated aliphatic carboxylic acid units of the general formula $C_nH_{2n-2}O_2$ such as acrylic acid ($C_2H_3COOH$), crotonic acid, vinyl acetic acid as well as ($C_1$–$C_3$ alk)acrylic acid such as methacrylic acid and the like and copolymers of said acids or with other non-acid comonomer, such as acrylonitrile, alkylenes, acrylic acid esters, alkacrylic acid esters, polyalkenyl ethers and the like. At least a portion of the acid groups are in salt form.

The term "polysulfonic acid polymer salt" is intended to define a hydrocarbon polymer having a plurality of aliphatic or aromatic sulfonic acid or sulfonyl chloride units pendent from the polymer chain and at least a portion of the acid groups are in salt form.

The polymer used to form the body of the sheet product of the present invention should be a halogenated polymer. Such polymers include polyvinyl halides, post-chlorinated polyvinyl chlorides and vinylidene defluoride polymers. The post-halogenated polyvinyl halides and, specifically, post chlorinated polyvinyl chlorides are preferred.

The polyvinyl halide found useful in forming the subject sheet product should have a halogen content of at least about 55 wt. percent of the polymer. The polymer can have the halogen randomly or systematically distributed along the polymer chain. The preferred polyvinyl halide has an inherent viscosity (ASTM D1243-66) of from about 1 to 1.5 and preferably from about 1 to 1.4. Low inherent viscosity grade (from at least about 1.02 to 1.06) material can be blended with high inherent viscosity grade material (inherent viscosity of greater than about 1.2).

The halogenated olefinic polymer used in forming the present sheet product can be a post-halogenated polyvinyl halide such as chlorinated polyvinyl chloride ("CPVC"). Formation of CPVC can be carried out in known manners either by Lewis acid or free-radical catalysis. The reaction can be run with the PVC polymer in solution, as a swollen polymer or as a dry powder or suspended in a non-solvent. Methods of forming CPVC material are described in the paper, "Chemically Modified Polyvinyl Chloride" by M. L. Dennis et al. contained in "Encyclopedia of Polyvinyl Chloride, "Vol. 1, Ed., L. I. Mass at pages 225 to 255 and the references cited therein, which teachings are incorporated herein by reference.

CPVC can have a structure wherein the chlorine is in 1,1 or 1,2 substitution or a combination thereof. The post-chlorinated PVC can be of the lower solubility type (G-type product) or the higher solubility type (L-type product) as both contain the solubility characteristics as described hereinbelow.

The chlorine weight content of the post-halogenated polyvinyl halide should be at least about 60%, with greater than 65% being preferred. This polymer can be blended with lower chlorine content (from about 55% to 65%) and higher chlorine content (from about 65% to 70%) material.

The halogenated polyvinyl halide (non-post-halogenated and post-halogenated) found useful herein should have a glass transition temperature of at least about 90° C. and preferably between about 95° C. and 110° C.

Other halogenated polymers found useful herein are homopolymers of vinylidene difluoride wherein the fluorine is in a 1,1 or 1,2 substitution configuration (1,1 preferred) or a combination thereof. (For example, a commercial product, Kynar ® 700) In addition, the polymer product may be selected from interpolymers of vinylidene difluoride with other fluorine-containing ethylenically unsaturated monomers which have been copolymerized therewith. The comonomer component may be present in up to about 30 weight percent. The fluorine containing unsaturated comonomers can, for example, be selected from hexafluoropropene (HFP), tetrafluoroethylene (TFE), perfluroalkyl perfluorovinyl ethers (preferably the alkyl is selected from $C_1$–$C_4$ alkyl) such as perfluoro(methylvinyl) ether, perfluoro(-propylvinyl) ether and the like, pentafluoropropylene, trifluorochloroethylene and the like. The subject polymer product, when in the form of an interpolymer can be composed of vinylidene difluoride with one or more than one additional comonomer. Of particular interest with respect to providing the subject sheet product are interpolymers of vinylidene difluoride/hexafluoropropene which contain at least 70 (preferably at least 75) weight percent of vinylidene difluoride monomeric units and the remainder being from hexafluoropropene monomer units (For example, a commercial product, Kynar ® 2801). Other important interpolymers for the present invention are composed of vinylidene difluoride in combination with hexafluoropropene and tetrafluoroethylene. Again, these interpolymers should be composed of vinylidene difluoride units in at least 70 weight percent and the remainder of the interpolymer being a mixture of HFP and TFE in any ratio but preferably in weight ratio of about 1:0.001 to 1:1.

The vinylidene difluoride polymers described above should be soluble in a first liquid and insoluble in a second liquid, as described fully herein below. The vinylidene difluoride polymers should be selected from high molecular weight polymers having a weight average molecular weight of at least about 250,000, preferably from about 250,000 to about 500,000. Higher molecular weight polymer can be used as needed to increase the tensile properties of the resultant sheet. Alternately, the polymers may include lower weight average molecular weight polymers of from about 100,000 to about 200,000 which are capable of contributing the desired viscosity to an initially formed dope composition. In certain instances, when a lower molecular weight polymer product is used, the dope composition may further contain known agents capable of causing vulcanization of the vinylidene difluoride polymers at temperatures to which the formed sheet product is subjected during or subsequent to formation. Such vulcanizing agents are well known and include, for example benzoquinones or 1,4-naphthoquinones in combination with usual additives, as discussed in U.S. Pat. No. 3,872,065 to Schmiegel, which teaching is incorporated herein by reference.

The vinylidene difluoride homopolymers and interpolymers described herein above as well as the other polymers suitable for blending with them are all well known materials. The methods of forming the desired polymer products are known to those skilled in the art. For example, Kirk Othmer, Encyclopedia of Chemical Technology, Vol. 8, Page 504 et seq. (1979) teaches high pressure emulsion polymerization using free radical catalysts to obtain vinylidene difluoride polymers. Normally, at low temperatures of less than about 50° C. with a radical initiator activated at such temperature, i.e. bis(r-t-butylcyclohexyl) peroxydicarbonate are used to provide high molecular weight product. A study of the fluoropolymers' physical properties is reported in Polymer (30)12, Page 2180 et seq. Formation of vinylidene difluoride high molecular weight homopolymers is taught in GB 1,188,889; of $VF_2$/HFP interpolymers in U.S. Pat. No. 3,051,677 and JP Kokai 02/029402; of $VF_2$/HFP/TFE interpolymers in U.S. Pat. No. 2,968,649 and JP Kokai 01/040509; of VF2/PFP interpolymers in U.S. Pat. Nos. 3,331,823 and 3,335,106; and of $VF_2$ with fluorinated vinyl esters in U.S. Pat. No. 3,235,537.

The halogenated olefinic polymer can be the sole polymeric component used in producing the subject battery separator or can be used in combination with a minor amount (preferably up to about 40 wt. percent, most preferably up to about 25 wt. percent) of other polymers which are compatible with the halogenated polymer (do not phase segregate), are stable (substantially inert from attack and decomposition by the battery components) to the battery environment for which the present separator is intended to be used. Examples of such supplemental polymers include polysulfones, polyacrylic acids and their esters, polyolefins, polycarbonates, polyurethanes, cellulosic material and the like.

It has been found that a tough, yet flexible sheet product can best be formed by having the polymeric component be formed from a composition composed of a mixture of halogenated olefin and from 0.5 to 10 weight percent (preferably 1.5 to 7 wt. %) based on the polymeric mixture of a polyacrylic acid or polyalkacrylic acid (e.g., polymethacrylic acid) or alkyl ester thereof (e.g., a $C_{1-3}$ ester). The preferred polyacrylics are those which are substantially free of tertirary hydrogen atoms. Sheet products formed with the above-described mixtures exhibit a combination of toughness and flexibility to provide battery separators which can maintain integrity under the adverse conditions found in operating batteries. The polymer or blend of polymers, as described hereinabove, should be soluble in a first liquid while being substantially insoluble in a second liquid (including mixtures of minor amounts of first liquid and major amounts of second liquid) and wherein the first and second liquids are miscible to a high degree with one another. The polymer should be soluble in the first liquid in dosages of at least about 2 wt. percent, preferably from about 2 to 30 wt. percent. High solubility within the first liquid is preferred. The first liquid can be a polar organic liquid, such as N-methylpyrrolidone, dimethylformamide, diethylformamide, dimethylacetamide and the like or a halogenated hydrocarbon such as dichloroethane, trichloroethane tetrachloroethane, trichloropropane and the like. The polar solvents having lower rates of vaporization are preferred as they readily form a solution with halogenated polymers and do not evaporate during the preferred mode of forming the subject separator, as described herein below. The second liquid can be chosen from water, or organic liquids which are miscible with the first liquid and incapable of dissolving the polymer. Such liquids include water, methanol, ethanol, ethylene glycol, glycerol, and the like. Water is the preferred second liquid. The second liquid should be used alone or with a minor amount (up to 40%, preferably up to 30%) of first liquid as the total weight of solution. High concentrations should be avoided (most preferred to have very low concentrations of up to about 20%) in providing the subject sheet product.

The filler to be used in forming the polymer/filler/first liquid mixture, described above and the resultant polymer/filler matrix of the sheet product of this invention should be a particulate material having high surface area (BET such as 20 to 950 $m^2$/gm, preferably at least 100 $m^2$/gm), high pore volume (BET; at least about 0.2 cc/gm; preferably at least about 1 cc/gm). The size of the ultimate (non-agglomerated) filler particulate material should be ultra small (an average diameter of from about 0.01 to about 75 microns, preferably from about 0.01 to about 50 microns). The filler should be substantially free of large (100 microns) diameter particulate material whether as ultimate or agglomerate material. The filler must be inert with respect to the battery environment and must be substantially insoluble with respect to the first and second liquids when used in forming the subject sheet product, as fully described hereinbelow.

The particulate material used as filler component of the subject sheet product can be selected from a variety of materials such as metal oxides and hydroxides as, for example, oxides and hydroxides of silicon, aluminum, calcium, magnesium, barium, titanium, iron, zinc and tin; metal carbonates as, for example, carbonates of calcium and magnesium; minerals as, for example, mica, vermiculite, montmorillonite, kaolite, attapulgite, talc, and diatomaceous earth; synthetic and natural zeolites; silicates as, for example, calcium silicate, aluminum polysilicates, alumina, and silica gels; cellulosic materials as, for example, wood flours, wood fibers, and bark products; and glass particles as, for example microbeads, hollow microspheres, flakes and fibers. Carbonaceous material as, for example, carbon black, acetylene black, coal dust, and graphite may be used in small amounts in combination with the other particulate material.

As stated above, the filler must be selected with respect to the battery environment with which the subject separator is intended for use. That is to say the particulate filler must be inert with respect to such end use battery environment. Therefore, alkali insoluble particulate such as titanium dioxide (preferred), oxides, hydroxides and carbonates of calcium, magnesium, iron and the like should be used only in sheet products which ultimately are formed into battery separators for alkaline batteries. Similarly, acid insoluble particulates such as silica (a precipitated silica is preferred), and the like should be used only in sheet products which ultimately are formed into battery separators for acid batteries. Certain particulates can be used in either acid, alkaline or neutral battery systems and include carbon, coal dust, graphite and barium sulfate. Particulate materials which are inert to a battery system can be mixed to form the total filler content used in the sheet product.

The sheet product of the present invention has a porous sheet contained within the thickness of the sheet product. The sheet can be in the form of a scrim, or woven or non-woven fabric or a knit material and can be formed from a continuous or non-continuous fibrous material. The material used to form the sheet component of the sheet product must be a material which is inert to the battery environment. Although the sheet component is contained in the interior of the sheet product's thickness, it is contacted with electrolyte solution (including cathodic and anodic material in the solution) as the solution passes through and is contained in the separator. Thus, the material can be, for example, selected from glass, polyolefin, polyester or polyacrylonitrile polymer filaments or mixtures or copolymers formed with other stable monomeric units (i.e. polyacrylonitrile/polyacrylic acid copolymer; polyolefin/polyacrylic acid copolymer) when the sheet product is used to form a battery separator for acid battery utility. The sheet may be planar (that is, have substantially planar major surfaces) or patterned (that is, have patterned elevated and depressed sections of the major surfaces. It is preferable to utilize a planar sheet to assure that the sheet is contained within the body (or thickness) of the sheet product. The sheet is preferably formed from a substantially uniform, thin denier thread (denier of from about 0.02 to 10) to also assure that the sheet is contained within the body of the sheet product. The particular thickness of the sheet should be less than about 0.8 (preferably less than about 0.6) of the thickness of the sheet product. The sheet should, preferably, have a tensile strength of at least 5 p.l.i. The sheet should extend for substantially the full length and breadth of the resultant sheet product.

The sheet product of the present invention can be formed by various means. Generally, the polymer and particulate material are mixed together with the first liquid to provide a substantially uniform polymer/filler/first liquid composition (sometimes referred to as the "dope composition"). The polymer may be present in from about 5–30 (preferably 10–20) wt. percent and the filler may be present in from about 5–40 (preferably 10–20) wt. percent of the total dope composition. In a preferred embodiment, 1 part (by wt) polymer, 1 part filler and 8 parts first liquid comprising a polar solvent are used to form a dope composition. The amount of polymer and filler used should be such that their ratio is substantially the ratio of polymer/filler required in the resultant sheet product. Normally this is 1:4 to 4:1 and preferably 1:1.5 to 1.5:1. The amount of first liquid used to make the dope composition must be sufficient to provide a composition having a viscosity of about from 100 to about 10,000 cps (Brookfield viscometer using #3 spindle at 12 rpm) preferably from about 1000 to 8000 cps to be sufficiently viscous to have "body" when combined with the sheet as described hereinbelow. To enhance the viscosity of the dope, one can add an effective amount of a viscosifying agent provided such agent is inert to the battery environment or is soluble in the second liquid and thereby removed along with the first liquid.

Another embodiment of the present invention provides a battery separator having low content (0 up to about 20 weight percent, preferably from 0 up to about 10 weight percent) of particulate filler, as described hereinabove. When low filler content is desired, it has been unexpectedly found that the filler can be removed provided the polymer component is composed of a major portion of a halogenated olefin with a minor portion of a structure enhancing agent. When such low-filler content sheet product is formed, the resultant separator is capable of maintaining its high void volume, exhibits very low electrical resistance when in the battery system (in comparison to sheet product void of structure enhancing) and exhibits high tensile strength.

The structure enhancing agent useful in the present invention when low-level filler separator is desired should be capable of exhibiting a combination of properties with respect to the particular halogenated olefin/first liquid and with respect to the resultant sheet product. Firstly, the agent should be capable of increasing the viscosity of the halogenated olefin/first liquid by a factor of at least about 5 fold and preferably at least about 10 fold. Thus, a halogenated olefin/first liquid having a viscosity of about 50 cps will have a viscosity of at least about 250 cps, preferably 500 cps (Brookfield, #4, 50 rpm) when the agent is made part of the dope composition. Secondly, the agent should be substantially insoluble in the second liquid or capable of being at least partially retained (such as a polymer alloy) in the sheet product after subjection to second liquid. Thirdly, the agent must be, similar to the halogenated olefin, stable with respect to the battery system contemplated for its use. Fourthly, the agent should aid in enhancing the pore volume of the resultant sheet product vis-a-vis sheet products formed from halogenated olefin without the agent. Fifth, the agent should be capable of imparting enhanced (i.e. lower) electrical resistance properties to the resultant separator (compared to sheet product without agent).

The formed separator unexpectedly exhibits the combined properties of high void volume, low electrical resistance, good physical strength and stability over extended periods of time, as required for a superior battery system. The separator is composed of a polymeric component formed of a mixture of a halogenated olefin and from about 0.1 to 15 weight percent (preferably about 1.5 to 10 wt. percent) based on the total weight of the polymer component of a structure enhancing agent as, for example, a polycarboxylic acid polymer salt or a polysulfonic acid polymer salt based on the total polymer content. In addition to the halogenated olefin/agent mixture, the sheet product may contain low-levels of particulate filler as, for example, of from 0 to about 20 weight percent, preferably from about 0 to 10 weight percent. The initially formed dope composition should contain the halogenated olefin and the agent (and, where desired, filler) in ratios appropriate to attain the above composition when the first liquid of the dope is removed. The amount of halogenated olefin contained in the dope may be from about 2 to 30 (preferably 2-20) weight percent with the agent and, if used, filler being in amounts dictated by the desired composition of the resultant sheet product and by the required dope viscosity, as described below.

The preferred structure enhancing agents for the halogenated olefin are polycarboxylic acid polymer salts or polysulfonic acid polymer salts, as described herein below (each referred to herein as "second polymer").

The polycarboxylic acid polymer salt can be formed from any polymeric hydrocarbon having aliphatic carboxylic acid groups pendent from the polymer's backbone chain. The preferred polycarboxylic acid polymers are polyacrylic acids, poly ($C_1$-$C_5$ alk)acrylic acids, copolymers of acrylic acids and alkacrylic acids as well as polymers and copolymers of said materials with other monomeric units such as acrylonitrile, an alkylene (e.g. butadiene, isoprene, ethylene, and the like). Preferred polymers are polyacrylic acid or polymethacrylic acid homopolymers or those which have only small amounts (e.g. less than 10%) of copolymer units. The most preferred polymers are acrylic acid polymers of high molecular weight which are cross-linked with a polyalkenylpolyether. (Sold under the trademark "Carbopol")

The polysulfonic acid polymer salts can be selected from any polymeric hydrocarbon having aliphatic free sulfonic acid groups or aliphatic sulfonyl chloride groups pendent from the polymer's backbone chain. Such polymers include for example, polyvinylsulfonic acid, polychlorovinyl sulfonyl chloride (sold under the trademark "Hypalon") and the like.

The polymer acids used to form the salts should be of a high weight average molecular weight of at least about 250,000. It is preferred that the polymer be of a molecular weight of from about 400,000 to about 5,000,000 and most preferably of from about 1,000,000 to 5,000,000. These polymers (as the salt) should be miscible with and swelling in the first liquid while being substantially insoluble or at least retainable therein as a polymer alloy with the halogenated olefin in the second liquid used in forming the subject separator. The particular liquids and halogenated olefin used in forming the separator will dictate the composition of the agent or second polymer to be used. The solubility characteristics of the second polymer can be readily determined by one skilled in the art by conventional techniques. The agent to be used for swelling and viscosity increase is determined by matching solubility, hydrogen bonding and dipole moment of the first liquid and polymer blend.

The second polymer should be at least partially neutralized by forming a salt of the carboxylic acid or sulfonic acid units. Such neutralization may be attained with from about 0.1 to 1.01, preferably from about 0.25 to 1 molar ratio of a base, such as an alkali or alkaline earth metal oxide or hydroxide when the resultant separator is contemplated for use in an alkaline battery system. In the case of acid battery separators, it has been unexpectedly found that a base in the form of organic amines, in particular secondary and tertiary amines, can be used to form the polymer salt to be included in the battery separator product and that such product is stable in and not detrimental to the battery environment. The amine can be selected from dialkyl and trialkyl amines wherein each alkyl is independently selected from a $C_2$ to $C_{20}$ alkyl group or a $C_2$-$C_{10}$ hydroxyalkyl group (preferably a higher alkyl such as a $C_6$-$C_{20}$ alkyl or a $C_3$-$C_6$ hydroxyalkyl) such as diamylamine, triamylamine, triisopropylamine, diisopropanolamine, dihexylamine, di(2-ethylhexyl) amine. For example, a halogenated olefin dope formed with dimethylformamide, N-methylpyrrolidone, diethylene glycol or dimethyl sulfoxide as the first liquid may contain a high molecular weight polyacrylic acid which is at least partially neutralized with diisopropanolamine, triethylamine, di(2-ethylhexyl)amine (preferred) and the like to provide a high viscosity dope.

The resultant dope should have a viscosity of from about 100 to 10,000 cps (Brookfield, #3 spindle, 12 rpm) preferably from about 500 to 8,000 cps to be sufficiently viscous to have "body" when combined with the sheet, as described below.

The polymer/filler/first liquid or polymer/agent/first liquid composition can be impregnated into the sheet in a manner which causes the composition to be uniformly distributed throughout the thickness of the sheet and to extend on each side thereof to form a coating of dope composition on each surface of the sheet. This can be done by various techniques such as dipping, coating, and the like. Whatever manner is used, the dope composition should be maintained free of gas bubbles or voids throughout the sheet and on each of the sheet's surfaces. It is preferable to impregnate and coat the sheet by applying the dope composition onto one major surface of the sheet and forcing it through the sheet while maintaining the other major surface substantially free. As the dope penetrates through the sheet in this manner, the air in the sheet's voids is forced to exit via the free surface and the free surface subsequently attains saturation and a coating of the composition. The dope may be applied in more than one application, such as by first applying a low viscosity (e.g. 400 to 1000 cps with #4 spindle at 50 rpm) dope and subsequently applying to at least one surface a higher viscosity dope.

The impregnated sheet is then contacted with the second liquid, as described above, to coagulate and solidify the polymeric component with its filler, where appropriate, while simultaneously removing the first liquid from the fibrous sheet composite. The second liquid should contact both surfaces of the previously impregnated sheet in a manner which provides for substantially equal and concurrent rates of removal of the first liquid from the impregnated sheet. The mixed liquid should be removed and replaced by fresh second liquid (most preferred to have 20% or less first liquid) to retain low concentration of first liquid in the contact bath. In this manner it has been found that the average pore size (diameter) of the pores at each major surface is substantially equal and less than that of the pores located in the internal section of the resultant sheet product.

It has been found that the formed sheet product of the present invention has porosity composed of pores such that there is a gradient of pore size increasing from each major surface of the sheet product towards the interior, central portion of its thickness. Generally, the pores exhibit a progressive and substantially continuous increase in pore diameter from each major surface towards the central section without having a major change occur at any one increment of the thickness including the region adjacent each major surface. In addition, the sheet product of the present invention preferably has a substantially uniform void volume profile across its thickness.

Although it is common practice to form membranes with the aid of a support member, it is preferred herein that the support sheet should be impregnated with the polymer/filler/first liquid or polymer/agent/first liquid dope composition by applying the dope onto one major surface of the support sheet and forcing it through the sheet while maintaining the other major surface free. As stated above, a second application of dope composition (preferably of higher viscosity) may be applied to one or both surfaces. This mode of application is preferred when applying a low filler content dope composition. The impregnated sheet is processed through a means for regulating its thickness such as by using doctor blades or the like and subsequently immersing the impregnated sheet into a bath of second liquid in a manner which substantially simultaneously contacts each of the major surfaces of the impregnated sheet to the second liquid. The second liquid should not be allowed to accumulate high concentrations of first liquid therein. The resultant sheet product should be washed with fresh amounts of second liquid to cause removal of the first liquid material. For example, when the first liquid is selected from a polar solvent such as N-methyl pyrrolidone, the amine solvent should be substantially completely removed.

The resultant sheet product is a microporous sheet of very high porosity (porosity of 50 vol. percent and even up to 80 vol. percent). The sheet product has a length and breadth and a predetermined thickness which should be less than about 50 mils, preferably less than about 10 mils. Very thin, flexible sheet products having good mechanical properties of tensile strength and modulus of elasticity have been unexpectedly formed. It is well known that halogenated polyolefin based membranes have very poor mechanical properties and that the inclusion of high levels of particulate filler into the polymer matrix would presumably further cause the sheet product to have increased brittle characteristics while the high porosity would be presumed to cause a sheet product of very low tensile strength and poor integrity. Instead, it has been unexpectedly found that the sheet product of this invention provides all of the desired properties for a battery separator including strength, flexibility, very low electrical resistance, good integrity, etc.

The resultant sheet product is a material having porosity composed of pores such that there is a gradient of average pore size from each major surface toward the interior, central portion of the sheet product's thickness. The average pore size in the region adjacent to each major surface is normally less than about 3 microns, preferably less than about 2 microns and most preferably less than about 1 micron. The interior region of the sheet product contains pores having an average pore size greater than that of the surface region (normally at least about 1.5 times). The overall average pore size may range from 0.01 to about 10 microns. These measurements can be made by scanning electron microscopy and analysis thereof and may be confirmed by mercury intrusion methods.

The resultant sheet product is composed of a halogenated olefinic polymer matrix of substantially a uniform composition. In the case of the highly filled embodiment the filler is substantially uniformally dispersed in the polymer and the polymer/filler weight ratio is from 4:1 to 1:4 and, preferably from 1:1.5 to 1.5:1. In the low-level filler sheet product will have a polymer matrix composition composed of from 2 to 30 (4 to 20 preferred) parts by wt. halogenated olefinic polymer; from about 0.1-5 (0.6 to 2 preferred) parts by weight agent or second polymer; and from 0 to 5 (0-2 preferred) parts by wt. filler. Further, when the sheet product is formed by a dual application, as described above and the second application is applied to one side only, the sheet may be assymetrically contained within the sheet product's thickness and a minor portion of the sheet's fleece may extend to the surface or beyond. This provides a highly effective anchor means to attach subsequently applied rib material to that surface of the sheet product (commonly used in acid batteries).

The sheet product may contain additional components such as viscosifier, surfactants, antioxidants, colorants, plasticizers and the like. Such materials can be incorporated in the sheet product by having them made part of the polymer/filler/first liquid composition, as one of the final washes of the second liquid or separately applied by spraying and the like.

The sheet product is a flexible material capable of being folded upon itself and formed into an envelope design. The initially formed sheet product may have a wrinkled configuration (especially when subjected to a free standing coagulation process). These wrinkles are readily removed by subjecting the sheet product to a heated roller or rollers while maintaining the sheet product under tension. The temperature of the heated rollers should be below the glass transition temperature of the particular polymer used (preferably at least about 25° C. below).

The sheet product can be cut into suitable shape to be used as a separator between electrodes of a battery design. The separator must extend the full length and width of the electrode to prevent electrodes of opposite polarity from contacting one another. In certain instances, it is preferred that the separator be void of patterns or other raised sections (generally for alkaline batteries) or may contain raised portions, such as ribs, buttons and the like (generally for acid batteries). The ribs or other raised portions can be formed from any polymeric material capable of adhering to the polymer used to form the base sheet product.

The following examples are given for illustrative purposes only and are not meant to be a limitation on the subject invention, as defined by the appended claims. All parts and percentages are by weight unless otherwise indicated. The electrical resistance was determined by the direct current method as described by J. J. Lander and R. D. Weaver in Characteristics of Separators for Alkaline Silver Oxide-Zinc Secondary Batteries: Screening Methods, ed by J. Cooper and A. Fleischer, Chapter 6 modified by using 35% $H_2SO_4$ as the electrolyte, $Hg/Hg_2SO_4$ type reference electrodes, and Pt screens as the current carrying electrodes. The voltage drop across the reference electrodes was measured at 20 ma.

EXAMPLE I

A solution was prepared by mixing 80 parts of polyvinyl chloride (Geon-30), a high pH (pH of 8.5) precipitated silica having an average particle size of 10 microns with particles ranging from 2 to 100 microns, 2.5 parts polyacrylic acid, 12 parts of a polyester (Paraplex G-25) as plasticizer for the polyvinyl chloride and 840 parts N-methylpyrrolidone using a high shear mixer (Myers). The solution had a viscosity of $1.03 \times 10^3$ cps (Brookfield viscometer with #3 spindle at 12 rpm). A 0.5 oz-/yd² nonwoven polyester fabric (fiber denier 2.2) was saturated with the solution by passing the fabric through slot of a trough which contained the polymer/filler solution.

The solution was thus forced through the fabric with removal of air and resulted in a saturated material having excess solution on both major surfaces. The saturated fabric as it left the slot had a thickness of 8 mils. The saturated material was caused to travel vertically until it entered a first aqueous bath and remained therein for about 30 seconds to allow solidification of the polymer and extraction of a portion of the organics. The material was then subjected to a series of aqueous baths composed of fresh D.I. water at 50° C. for further removal of organics. The formed material was air dried at 60° C. for 3 min. The material was analyzed for residual organic (NMP) by dissolving a sample in THF and analyzing using gas phase chromatography. The material contained less than 1% NMP by weight based on the dry weight of the membranes. The morphology was analyzed using scanning electron microscopy (SEM) and the porosity was determined to have very small pores (up to about 0.3 microns) at the membrane surface with increasingly larger pores to a pore size of from 2 to 5 microns at the internal center portion of the membrane's thickness. The nominal pore volume was substantially equal throughout. The total void volume of 73% was determined by difference between the weight of dried sample and after saturation with isopropanol. The electrical resistance was 2.3 ohm-cm.

EXAMPLE II

A separator product was formed in the same manner as described in Example I above except that the polymer/filler/solution was formed from 80 parts of a post chlorinated polyvinyl chloride (Temp Rite 666×512), 80 parts of acid neutralized precipitated silica (Sylox-2) (pH of 7) having an average particle size of 10 microns and a particle range of from 2 to 100 microns, 2.5 parts polyacrylic acid, 1 part diethyldihexylamine, 1 part of a polyester as plasticizer and 840 parts N-methylpyrrolidone. The solution had a viscosity of $5.01 \times 10^3$ cps. The saturated fabric had a thickness of 8 mils. The formed separator exhibited a total void volume of 67 percent, a morphology of very small pores (up to 0.3 microns) at the surface with gradually larger pores to 2 to 5 microns at the internal central portion and the web was internal in the separator product. The separator had an ER of 1.1 ohm-cm.

EXAMPLE III

Separators were formed by initially forming polymer/filler dope solutions (composition indicated in Table I) and saturating a non-woven web with the formed solution by passing the web over one roller of a pair of reverse kiss rollers to which the solution was introduced. The solution was forced through the web with removal of air to provide a saturated material having excess solution on both major surfaces. The saturated fabric was then caused to travel in a substantially vertical direction while passing through a set of gapping bars to provide a saturated material of about 7 to about 11 mils thick. The material then entered a first aqueous bath and remained therein for the time indicated below to allow solidification of the polymer and extraction of a portion of the organics. The material was then subjected to a second aqueous bath composed of fresh D.I. water at 50° C. for further removal of organics. The formed material was air dried at 60° C. for 3 min. The material was analyzed for residual organic (NMP) by dissolving a sample in THF and analyzing using gas phase chromatography. The morphology was analyzed using scanning electron microscopy (SEM). The total void volume was determined by difference between the weight of dried sample and after saturation with isopropanol. The electrical resistance was determined by the direct current method.

EXAMPLE IV

A glass lined mixing container equipped with a turbine blade mixer was charged with 858 parts of N-methyl pyrrolidone solvent. 60 parts of powdered vinylidene difluoride homopolymer (Kynar 761 having $MW_w$ of 455,000; $MW_n$ of 91,000; melting temperature of 165°–170° C.) was slowly added and mixed for about 45 minutes to provide a uniform solution. 80 parts of powdered silica (DeGussa Sipernat 50-S; particule size 1–10 microns) was then added and mixed for 30 minutes. Two parts of fluorinated surfactant (Fluorad FC-100, a product composed of N-ethyl-N-[$C_4$-$C_8$ perfluoroalkyl]sulfonyl glycine potassium salt) was added and mixed for several minutes. The resultant dope had a viscosity of $2.61 \times 10^2$ cps (Brookfield viscometer #3 spindle at 12 rpm; temperature of 23.8° C.).

The dope was charged into an applicator equipped with a V-trough saturating head. The dope was applied to both surfaces of a polyethylene phthalate continuous filament non-woven sheet of 6 mil thickness. The dope was allowed to fully saturate the sheet. The resultant saturated sheet was passed through spaced blades to form a sheet of 8 mils and then immersed into a water (ambient temperature) bath to precipitate the polymer and extract the MMP solvent. Further treatment with water was done to assure complete removal of NMP.

The membrane was dried in an air oven at 60° C. for 5 minutes. The porosity and ER were measured on multiple samples and found to have an ER of $1.47 \pm 0.06$ milliohm-inch square and a porosity of 71%.

EXAMPLE V

The process of Example IV was repeated except that the polymer used was a vinylidene difluoride/hexafluoropropene copolymer having greater than 60 percent vinylidene difluoride (Kynar 2801; $MW_w$ of 429,000; $MW_n$ of 107,000; Melting temperature of 140°–145° C.) and the silica particulate filler was a precipitated silica powder (W. R. Grace & Co.-Conn. product Sylox-2 having average particle size of 10 microns and particle size of less than 100 microns). The resultant dope had a viscosity of $4.11 \times 10^2$ cps (Brookfield #3 spindle at speed setting of 12 rpm; 24.8° C.).

The resultant sheet product was a strong, flexible material. Multiple samples showed an ER of $0.61 \pm 0.06$ milliohm-inch square and porosity of 76%.

EXAMPLE VI

The process of Example I was repeated except that the polymer was replaced with vinylidene difluoride/hexafluoropropene copolymer (Kynar 2801). The solvent, silica and surfactant were as described in Example 1. The resultant dope had a viscosity of $6.01 \times 10^2$ cps (Brookfield #3 at 12 rpm; 27.4° C.).

The resultant sheet (multiple samples) was analyzed for ER, surface tension and porosity and the ER was found to be 0.49 milliohm-inch square; surface tension of $34.5 \pm 0.2$ dynes/$cm^2$ and porosity of 80%.

EXAMPLE VII

The process of Example 1 was followed except that 13,620 parts of NMP was first mixed with 191 parts of powdered polymethyl methacrylate ($MW_w$ of about 250,000 and 763 parts of vinylidene difluoride/hexafluoropropene copolymer (Kynar 2801) for one hour. 1271 parts of silica powder (Sipernat 50-S) was then charged into the solution and mixed for 45 minutes followed by the addition of 32 parts of fluorinated surfactant (FC-100). The viscosity of the resultant dope was $44.1 \times 10^2$ cps at 6° C.

The dope was used to form a sheet product having a thickness of 8 mil. The resultant product had an ER of 3.6 milliohm-inch square and a porosity of 54%.

EXAMPLE VIII

A solution was prepared by mixing 1590 parts of polyvinylchloride (Geon-30) with 14000 parts of N-methyl pyrrolidone (NMP) using a low speed mixer. 40 parts of polyacrylic acid (Carbopol 940; $MW_w = 4,000,000$) and 16 parts di(2-ethylhexylamine) in 300 parts of NMP were added to the polyvinylchloride solution. The solution was thoroughly mixed and had a viscosity of $220 \times 10^3$ cps (Brookfield #3 at 12 rpm).

A 0.75 oz/$yd^2$ non woven polyester fabric (Reemay) was saturated with the polyvinylchloride solution by passing the fabric through the solution (which had been filtered and deaerated) using a double knife blade to regulate the dope/fabric application and thickness. The saturated fabric was then caused to travel in a substantially vertical direction into an aqueous bath remaining therein for about 30 seconds. The sheet product was then washed in a series of aqueous solutions to remove NMP and then air dried at 60° for 5 minutes. The sheet product was cut into samples. The pore morphology was analyzed by SEM and found to be similar to the sheet of Example I above. The sheet thickness was approximately 7.5 mils, had an electrical resistivity of 8.27 mohm-$in^2$ after a four hour soak in $H_2SO_4$ and a porosity of about 44%.

What is claimed:

1. A battery separator comprising a microporous sheet product having a thickness of less than about 50 mils bound by first and second major surfaces of the sheet product, comprising a substantially uniform mixture of from 1:4 to 4:1 wt. ratio of a halogenated polyolefin polymer and a particulate filler with a porous sheet embedded between the first and second major surfaces of the sheet product, and having porosity throughout the sheet product's thickness with a pore size distribution such that the average pore size increases from each major surface towards an interior, central portion of the sheet product's thickness.

2. The battery separator of claim 1 wherein the pore size distribution is substantially continuous in increase of average pore size from each major surface to the interior, central portion of the sheet product's thickness.

3. The battery separator of claim 1 wherein the average pore size of the sheet product is less than about 10 microns, the average pore size of the pores in the thickness adjacent to each of the first and second major surfaces is substantially equal and less than about 3 microns and the pore size distribution is substantially continuous in increase of average pore size from each major surface to the interior, central portion of the sheet product's thickness.

4. The battery separator of claim 1 wherein the filler is selected from an inert inorganic particulate, said particulate having a surface area of from about 20 to 950 $m^2$/gm, a pore volume of at least 0.2 cc/gm, an average particle size of from about 0.01 to 75 microns and is substantially free of particles having particle size larger than 100 microns.

5. The battery separator of claim 1 wherein the ratio of support sheet thickness to separator sheet product thickness is up to about 0.8, said support sheet is a woven, non-woven or knit formed from 0.02 to 10 denier fiber and the sheet product has a total void volume of at least about 60 volume percent.

6. The battery separator of claim 4 wherein the filler is selected from the group consisting of oxides and hydroxides of calcium, magnesium, titanium, aluminum and mixtures thereof and oxides of silicon.

7. The battery separator of claim 1, 2, 3, 4, 5 or 6 wherein the polymer is selected from the group consisting of a post-chlorinated polyvinyl chloride polymer having at least 60 wt. percent chlorine therein and a vinylidene flouride polymer.

8. A battery separator comprising a microporous sheet product having a thickness of less than about 50 mils bound by first and second major surfaces of the sheet comprising a substantially uniform mixture of a halogenated polyolefin polymer and from about 0.1 to 15 wt. percent based on the halogenated polyolefin polymer of a structure enhancing agent with a porous sheet substantially embedded between the first and second major surfaces, and having porosity throughout the sheet product's thickness with a pore size distribution such that the average pore size increases from each major surface towards a interior, central portion of the sheet product's thickness.

9. The battery separator of claim 8 wherein the support sheet within the sheet product thickness is positioned adjacent one of the major surfaces.

10. The battery separator of claim 8 or 9 wherein the agent is selected from the group consisting of a polycarboxylic acid polymer salt and a polysulfonic acid polymer salt formed with 0.1 to 1.01 molar equivalent of base selected from the group consisting of alkali metal, alkaline earth metal, a secondary amine and tertiary amine.

11. The battery separator of claim 8 wherein the sheet product has a polymer matrix composed, of from about 65 to 99.9 weight percent of a halogenated polyolefin polymer, from about 0.1 to 15 weight percent of a structure enhancing agent and from 0 to about 20 weight percent of particulate filler.

12. A battery separator of claim 11 wherein the particulate filler is selected from the group consisting of oxides and hydroxides of calcium, magnesium, titanium, aluminum, and mixtures thereof and oxides of silicon.

13. In a battery having at least one pair of electrodes of opposite polarity, an electrolytic composition and a separator positioned between adjacent electrodes of opposite polarity, wherein the improvement comprises that the separator extends at least the length and breadth of the electrodes and comprises the product of claim 1, 2, 3, 4, 5, 6, 8, 9, 11 or 12.

14. In a battery having at least one pair of electrodes of opposite polarity, an electrolytic composition and a separator positioned between adjacent electrodes of opposite polarity, wherein the improvement comprises that the separator extends at least the length and breadth of the electrodes and comprises the product of claim 7.

15. In a battery having at least one pair of electrodes of opposite polarity, an electrolytic composition and a separator positioned between adjacent electrodes of opposite polarity, wherein the improvement comprises that the separator extends at least the length and breadth of the electrodes and comprises the product of claim 10.

* * * * *